United States Patent [19]
Waring

[11] 3,883,428
[45] May 13, 1975

[54] FILTER

[76] Inventor: Robert W. Waring, 197 Old Post Rd., Fairfield, Conn. 06430

[22] Filed: Sept. 14, 1973

[21] Appl. No.: 397,388

[52] U.S. Cl. ................. 210/94; 210/266; 210/282; 210/444
[51] Int. Cl. ............................................. B01d 27/00
[58] Field of Search ............ 210/96, 167, 168, 232, 210/266, 282, 288, 91, 443, 444, 446, 447, 448, 499, 95, 94

[56] References Cited
UNITED STATES PATENTS

| | | | |
|---|---|---|---|
| 1,630,287 | 5/1927 | Amdursky | 210/443 X |
| 3,289,847 | 12/1966 | Rothemund | 210/282 X |
| 3,322,279 | 5/1967 | Kasten | 210/91 X |
| 3,651,607 | 3/1972 | Lee | 210/167 X |
| 3,780,867 | 12/1973 | Zirlis | 210/282 X |
| 3,785,970 | 1/1974 | Hodgkins | 210/232 X |

FOREIGN PATENTS OR APPLICATIONS

| | | | |
|---|---|---|---|
| 553,819 | 3/1958 | Canada | 210/282 |

*Primary Examiner*—Charles N. Hart
*Assistant Examiner*—Robert H. Spitzer
*Attorney, Agent, or Firm*—Holland, Armstrong, Wilkie & Previto

[57] ABSTRACT

An improved filter is described for use in filtering liquids where a typical use would be filling small water tanks as used on yachts or campers and the like. The filter includes a mechanical filter in the form of a knitted or woven cloth member positioned in series with a chemical filter comprising activated carbon. The cloth filter is positioned in advance of the carbon filter and is arranged so that it may stretch during the life of the filter to compensate for the accumulation of filtered particles within it. This stretching of the cloth filter causes its pores or openings to remain effective for a long period so that a continuing effective filtration is obtained long after a normal rigid mechanical filter would become stopped up and ineffective.

7 Claims, 9 Drawing Figures

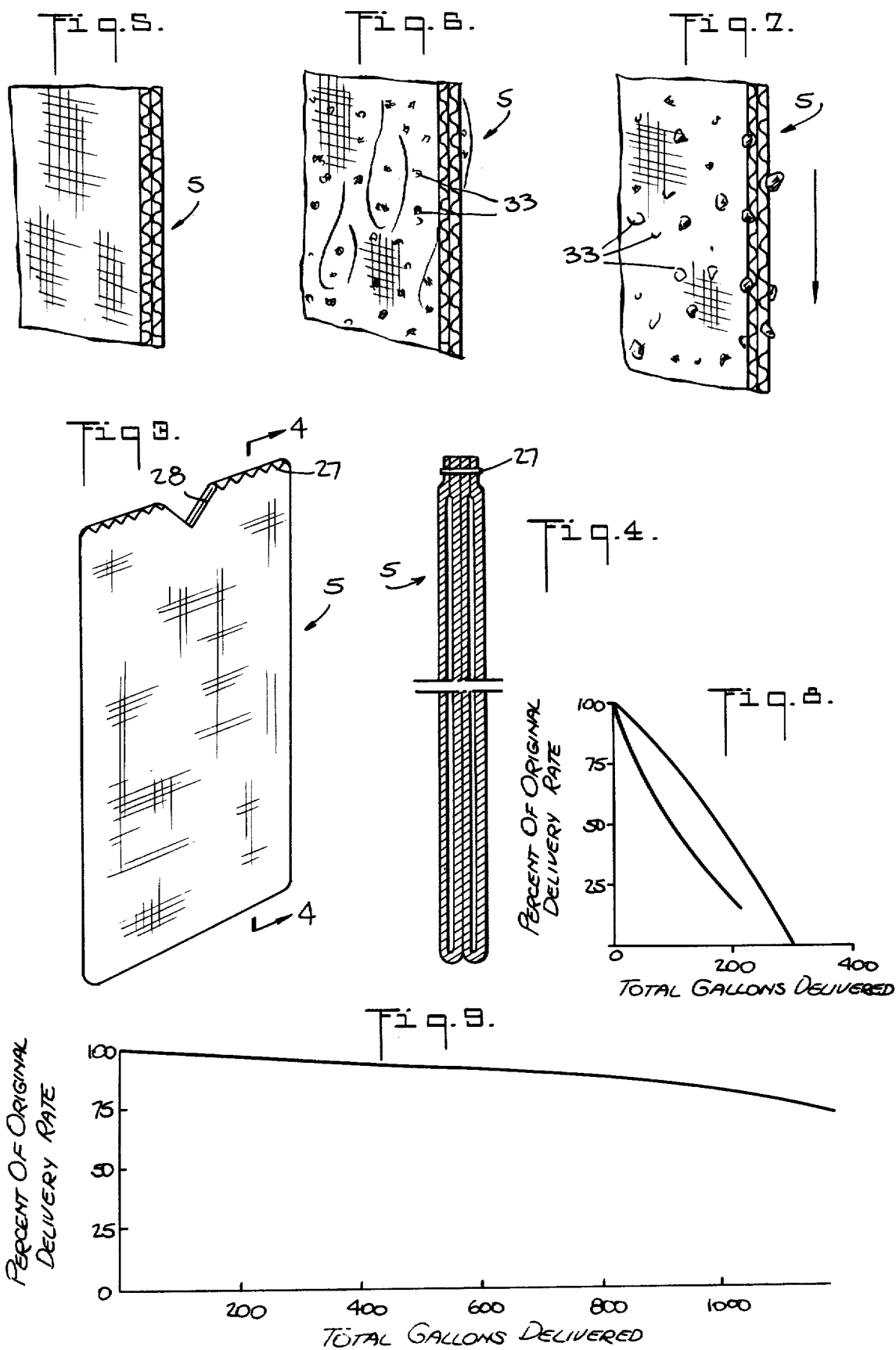

FILTER

BACKGROUND OF THE INVENTION

The present invention relates to a filter and more particularly to a filter useful for servicing water tanks on yachts, etc., where the filter provides efficient mechanical and chemical filtering action for a greater volume of water.

There are a great number of relatively small drinking water or other water supply systems such as are used on yachts or house trailers or other installations where the tanks of the system are filled from municipal or other conventional water supply sources. Even where these sources are considered suitable for drinking and other uses, problems are encountered in filling small tank feed system from these water sources where the water is stored in the tanks over a substantial period. These water sources may contain, and usually do contain, dissolved gases such as carbon dioxide and chlorine as well as algae, metallic phosphates and solid debris. While this matter is acceptable in normal municipal supply systems and presents no pollution problems, its presence in tank storage systems produces undesirable tastes or odors and causes objectionable algae growth and sedimentation.

There are prior means which have been used to combat these problems such as the use of purifying pellets and placing filters on the tank outlets. Pellets are not practical for typical storage periods for reducing all of the unpleasant effects and do not remove solid debris. The filters used to date have two principal drawbacks in that they either do not provide an effective mechanical and chemical filtering action or their filtering period is objectionably short and will effectively filter only relatively small volumes of water.

For example, filters are now used which include an activated carbon filter element in combination with a metal or a plastic mechanical strainer. The strainers used in these cases have a predetermined mesh or aperture size. Those filters with large apertures function for longer periods but they permit objectionable solid debris to pass through both the strainer and the carbon filter element so that they enter the tank or distribution system. The mechanical filters with an initially small mesh size rapidly become clogged with filtered debris causing a rapid loss of filter capacity.

The filter in accordance with the present invention provides for an improved combination of an activated carbon filter element with an improved mechanical filter. In particular, the mechanical filter is formed of a flexible or stretchable material mounted in such a position that the filter stretches automatically under the force of the liquid pressure to compensate for the entrapment and build-up of solid debris in the mechanical filter. The stretchable mechanical filter and chemical filter combination is provided in a compact portable unit easily used with water supply hoses or otherwise in water systems as used on yachts, trailers, motor homes and the like.

Accordingly, an object of the present invention is to provide an improved filtering system for fluid systems which provides an effective mechanical and chemical filtering action.

Another object of the invention is to provide an improved relatively small fluid filter with a long effective life.

Another object of the invention is to provide an improved water filter having a substantially constant filtering capability over an extended period of use.

Another object of the invention is to provide an improved combined mechanical and chemical filter for tank-fed water supply systems.

Another object of the invention is to provide a filter assembly in which the filtering element or subassembly is renewable.

Other and further objects of the invention will be obvious upon an understanding of the illustrative embodiment about to be described or will be indicated in the appended claims and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawing forming a part of the specification, wherein:

FIG. 3 is a perspective view of the cloth or mechanical filter element prior to its insertion in the filter.

FIG. 4 is a vertical sectional view of the filter element of FIG. 3.

FIGS. 5, 6 and 7 are perspective views of a small section of the mechanical filter illustrating its expanding action as it becomes partially clogged with filtered debris.

FIG. 8 is a graph illustrating typical delivery rates for a filter employing a rigid mechanical strainer.

FIG. 9 is a corresponding graph illustrating the efficiency of a filter in accordance with the present invention.

DESCRIPTION OF THE PREFERRED EMBODIMENT

Figure 1:
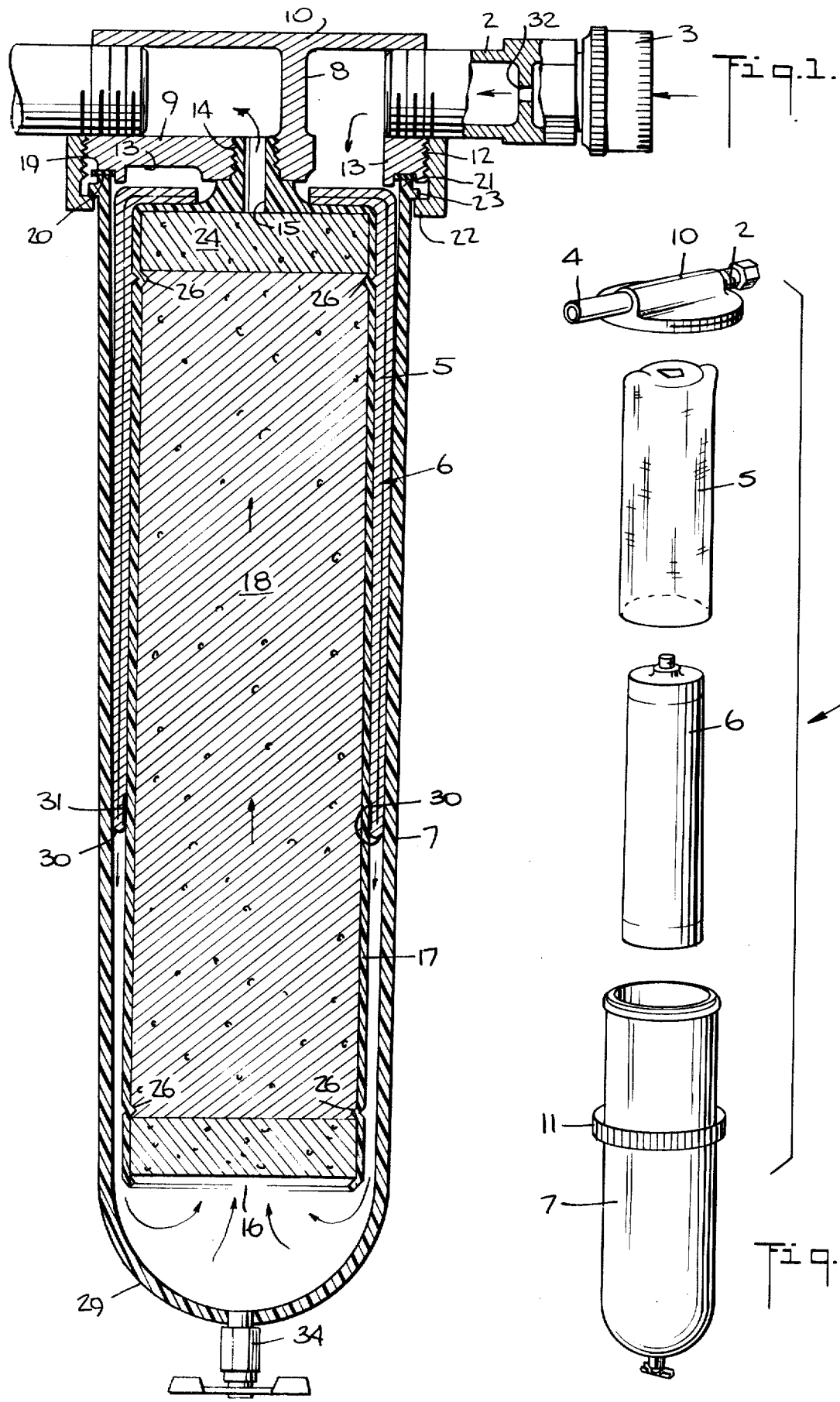
FIG. 1 is a vertical sectional view of a preferred embodiment of the improved filter in accordance with the present invention.
Figure 2:
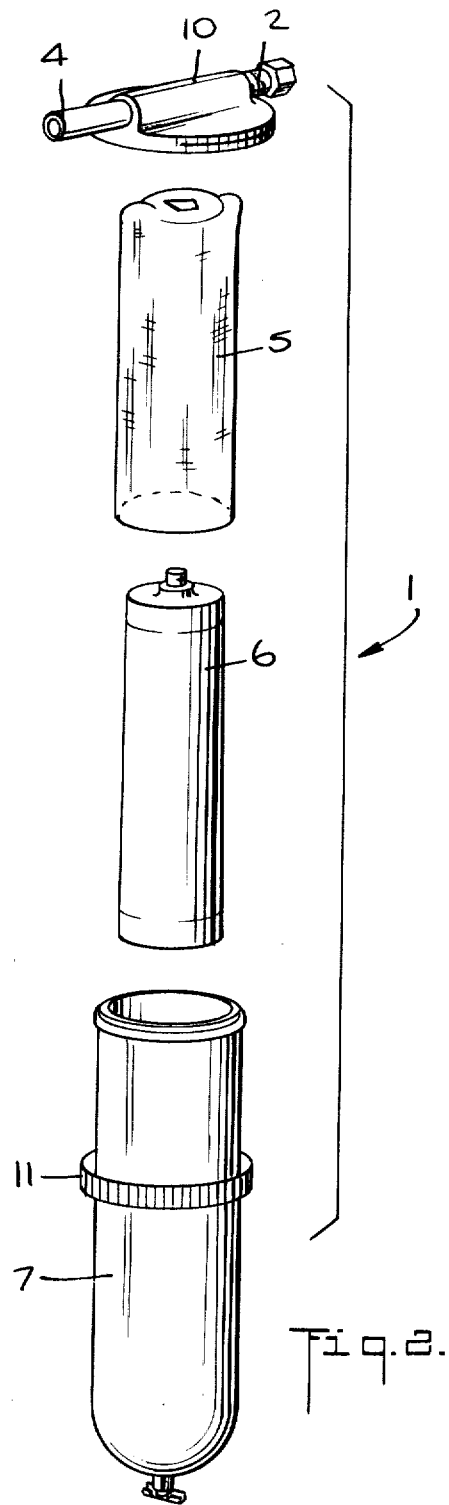
FIG. 2 is an exploded perspective view of the filter of FIG. 1.

A general description of the filter will first be given with particular reference to FIGS. 1 and 2. The filter 1 includes an inlet 2 with a suitable coupling 3 and an outlet 4 with the filtering elements 5 and 6 positioned in the water flow path through a case 7 between the inlet 2 and the outlet 4. The inlet 2 and outlet 4 communicate with spaced chambers 8 and 9, respectively, of a hollow cover 10. The cover 10 is releasably coupled to the hollow filter case 7. The case 7 is attached to the cover 10 by means of a threaded locking ring 11 which engages a threaded portion 12 on the filter cover 10. The inlet 2 connects with the interior of the filter case 7 through the chamber 8 and an inlet port 13. An outlet port 14 is provided within the filter cover 10 to communicate with the filter outlet 4 through chamber 9.

The filtering elements 5 and 6, which will be described in greater detail below, include the central chemical filter 6 which is surrounded by the mechanical filter 5 in the form of a fibrous boot. The inner chemical filter 6 is threadedly connected at its upper outlet 15 to the filter outlet port 14. The fluid inlet for the inner chemical filter comprises an opening 16 at the bottom of a waterproof outer plastic sheath 17. Water entering through the filter inlet 2 and the filter inlet port 13 passes downwardly through the boot or mechanical filter 5 surrounding the inner filter 6 and thereafter passes through the opening 16 of the inner filter. This water flows upwardly through the filtering material 18 within the inner filter 6 so that the filtered water finally passes through the outlet port 15 in the filter top and thence through the filter outlet 4.

As will be more fully described below, a mechanical filtering action occurs in the boot member 5 and a chemical filtering action takes place within the inner filter 6 so that the water flowing from the filter outlet 4 is both mechanically and chemically filtered.

The filter cover 10 is preferably formed from a high strength corrosion resistant metal molded into the necessary shape to include the passages and chambers described above. The locking ring 11 is similarly made of a suitable corrosion resistant metal. The casing 7 is preferably molded from a high strength corrosion resistant plastic, such as melamine. A preferred form of the casing is made of transparent plastic permitting the condition of the boot 5 to be observed thereby providing a visual indication of the condition of the boot 5 and of the probable remaining filter life. The casing 7, for example, may be made from a clear melamine or other clear high strength plastic. A gasket receiving groove 19 is provided for a gasket 20 in the filter cover 10 for receiving the rim 21 of the filter case 7 and for sealing the assembled cover 10 and case 7 when they are attached by the locking ring 11 as the locking flange 22 on the ring 11 engages the cooperating flange or bead 23 at the rim of the case 7. The inner or chemical filter 6 preferably comprises the molded plastic outer sheath 17 formed with the integral outlet port 15 which is threaded for attachment to the corresponding outlet port 14 in the filter cover 10.

The preferred chemical agent or chemical filtering material 18 in the inner filter 6 is activated carbon in granular form. This granular carbon is held in position within the plastic sheath 17 between an upper baffle 24 and a lower baffle 25 which are held in position in the sheath 17 between suitable detents 26 formed in the plastic sheath material. The baffle members 24 and 25 are corrosion proof elements with high porosity for permitting liquid flow therethrough with the pores being made sufficiently small to contain the particles of granular carbon. Suitable baffles may be formed of porous ceramic or cellulose or sintered materials with their primary function being the containment of the carbon granules while permitting free liquid flow.

The outer or mechanical filter is the elastically woven or knitted fibrous boot 5. A preferred form of the boot 5 is a closely woven cotton or other fibrous material in tubular form of a proper diameter to fit snugly over the plastic sheath of the inner filter 6. A preferred fibrous filter is a tubular one folded back upon itself in the manner illustrated in FIGS. 1 and 4 with the open ends 27 being stitched together at the top or at the inlet end of the filter 5. A cut-out 28 is provided in the center of the stitched end 27 which may be passed over the threaded outlet 15 of the inner filter 6. The woven filter 5 extends downwardly in the space between the filter case 7 and the outer cylindrical surface of the inner filter 6 with the inner filter 6 diameter being dimensioned to cause a snug fit for the woven filter 5. This annular space between the outer surface of the inner filter 6 and the inner surface of the filter case 7 preferably is tapered to have a decreasing width toward the bottom 29 of the casing. The woven fibrous boot 5 may be treated with a wetting agent before insertion into the case 7. For facilitating assembly, the closed or lower end 30 of the woven filter may be cemented to the plastic sheath 17 of the inner filter 6. This attachment may be made by using a suitable adhesive or by using a pressure sensitive tape with pressure sensitive adhesive on both surfaces of the tape 31.

As indicated above, the liquid being filtered flows downwardly through the mechanical or woven filter 5 and thereafter flows upwardly through the carbon granules 18 of the inner filter 6 to the filter outlet 4. It is preferable that a liquid flow control means be incorporated in the filter 1 to limit the liquid flow through the activated carbon to a flow rate which provides an adequate contact time between the carbon granules and the flowing liquid for the purifying action. A preferred form of the control device is a control orifice 32 formed in the inlet 2. For example, with typical liquid supplies having pressures of between about 60 and 80 psi, an orifice of about 0.10 to 0.13 inch in diameter will give a satisfactory liquid flow for a liquid with the approximate viscosity of water of about 2.5 gallons per minute where the inner filter 6 has carbon granules in a cylinder of about 2 inches in diameter and about 8 inches in length and where a two layer mechanical filter 5 occupies a spacing of about ⅛ to ¼ inch in width. The orifice 32 diameter may be adjusted for differing liquid pressures and filter sizes to assure adequate filtering action by the carbon granules.

The filter of this invention has an extremely long effective life which results from an improved filtering action of the mechanical filter 5. This action will be described with particular reference to FIGS. 5, 6 and 7 which show successive conditions of the filter 5 during a typical filter use. FIG. 5 shows the filter 5 at the beginning of the filter use where the filter pores are clear of filterable material for performing a mechanical filtering operation. As the filter 5 is used, the minute but still objectionable particles or solid debris which are invariably present, even in acceptable liquid sorces, are entrapped by the pores and the mechanical filter 5. FIG. 6 shows a number of these particles 33 entrapped in the mesh of the filter 5. As this entrapment occurs and as a number of entrapped particles 33 increases, the increasing pressure drop of the liquid through the filter 5 causes it to stretch longitudinally of the filter case 7 causing a partial enlargement of the filter pores or mesh as the flowing liquid continues to seek a path through the filter 5. This stretching or enlarging action of the pores or fibers provides for a continuing flow path for the liquid while at the same time permitting the filter 5 to continue its filtering action. As more and more particles 33 are entrapped in the filter 5, as shown in FIG. 7, the liquid pressure continues the stretching action to keep the filter 5 operative. The inward taper of the casing 7 causing a narrowing of the space between the inner wall of the casing 7 and the inner filter 6 permits the filter 5 to continue to fill the space as it is stretched downwardly.

The result of this stretching action, resulting from an accumulation of filtered material and the continuing liquid pressure, provides for a significant increase in the effective life of the mechanical filter. The life of the mechanical filter 5 may in this way be matched to the effective life of the carbon granules positioned in the inner or chemical element 6 of the filter 1. This action lengthens the filter life since prior filters have been found to have their life limited by premature clogging of the mechanical portions of the filters.

A drain 34 is provided in the bottom of the filter 1 for removing standing liquid from portable units and as a pressure release in in-line arrangements during filter element renewal.

The graph in FIG. 8 shows the performance of a filter using a rigid mechanical filter with a carbon filter in series. It is a plot of liquid flow in total gallons delivered versus the flow rate as a percentage of the original flow rate. An almost total loss of flow rate is seen to occur even before the delivery of 200 gallons of filtered liquid.

FIG. 9 is a corresponding graph for the filter of this invention of the filtered liquid delivery plotted versus percentage flow rate showing a continuing flow rate above 75% even after a 1000 gallon delivery. These graphs illustrate the significant improvement in liquid flow through filters made in accordance with this invention.

It will be seen that an improved filter has been provided with improved mechanical filtering and where an effective combined mechanical and chemical filtration is provided. A relatively small filter of convenient size operates to provide greater total volumes of filtered liquid. The filter, as described, is of relatively simple form and is sufficiently compact so that it may be used conveniently with filling systems of the type used for supplying water to small tanks, such as are used in yachts and trailers and similar tank fed liquid supply systems.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A liquid filter comprising the combination of an elongated hollow casing having a liquid inlet and a liquid outlet at one end thereof, an elongated inner chemical filter element comprising an imperforate sheath with its opposite ends open and filled with chemical filter material, said inner filter element being positioned within said casing with one open end of the sheath adjacent to said inlet and outlet and communicating only with the filter outlet and having the sheath's opposite open end in communication with the interior of the hollow casing, a space between the inner filter sheath and the inner surface of the casing in communication with said filter inlet, a second filter element comprising an elongated fibrous boot positioned in said space engaging the inner surface of the casing and the sheath of said inner filter and fixed at said one open end of said sheath whereby the liquid flows from said filter inlet through the boot in said space and thereafter through the said opposite open end of said inner filter element sheath and through said chemical filter material to said outlet.

2. The liquid filter as claimed in claim 1 in which said hollow casing is transparent.

3. The liquid filter as claimed in claim 1 which further comprises a liquid flow control means in the inlet of the casing.

4. The liquid filter as claimed in claim 1 in which said casing has a decreasing diameter towards its other end whereby the annular space between the inner wall of the casing and the sheath of said chemical inner filter element narrows towards the other end of the casing.

5. The liquid filter as claimed in claim 1 in which said second filter element comprises a knitted boot.

6. The liquid filter as claimed in claim 1 in which said second filter element comprises a woven boot.

7. The liquid filter as claimed in claim 1 in which said inner chemical filter comprises activated carbon granules.

* * * * *